June 16, 1964  D. E. CORNELL III, ETAL  3,137,078
PORTABLE TEACHING DEVICES

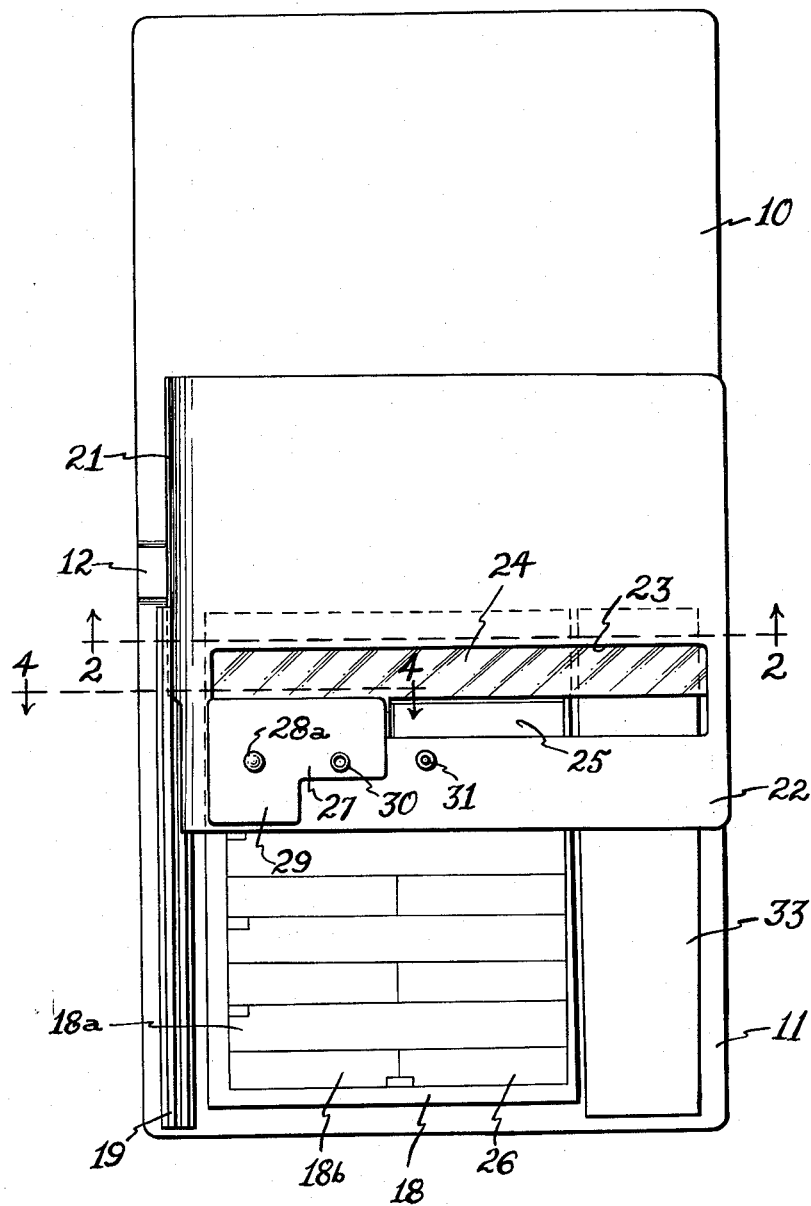

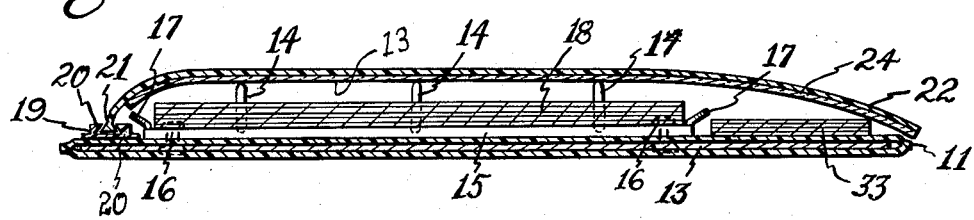
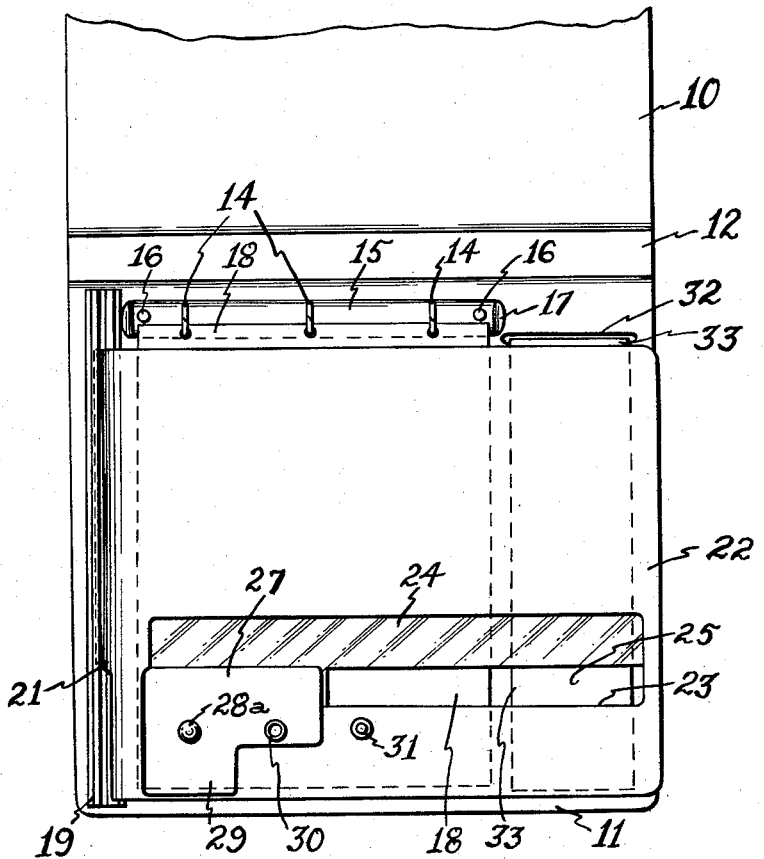

Filed Nov. 2, 1961  3 Sheets-Sheet 3

INVENTORS
DUDLEY E. CORNELL III
ROBERT A. O'CONNELL
BY John F. Brezina
Attorney

United States Patent Office 3,137,078
Patented June 16, 1964

3,137,078
PORTABLE TEACHING DEVICES
Dudley E. Cornell III, Albuquerque, and Robert A. O'Connell, Cedar Crest, N. Mex., assignors, by mesne assignments, to Teaching Machines, Inc., Albuquerque, N. Mex., a corporation of Delaware
Filed Nov. 2, 1961, Ser. No. 149,778
2 Claims. (Cl. 35—9)

This invention relates to a programmed teaching device, and more particularly to a self-tutoring portable teaching device employing printed or written programs in which bits of information are supplied, a question is asked on each bit of information to which the student writes an answer, and then the correct answer is presented to view to enable the student to check the correctness of his recorded answer. The printed correct answer is not made available to the student until the area of the sheet bearing his answer has been made unavailable for changes in his answer.

In general, our teaching device comprises two rigid rectangular sheets or covers flexibly attached or connected along one edge of each so that they may be folded into a superimposed position, or extended into a single plane, or rotated through an angle greater than 180 degrees to form a stand. Said flexibly connected backing sheets and their flexible connection form a protective and holding binder. One rigid sheet has attached thereto, along the edge having the flexible attachment to the second rigid sheet, an arrangement of at least two spaced apart releasable clamping rings which are normally spring pressed into closed position. These rings are adapted to receive and hold at the top thereof a collection of information and question program pages. A primary panel-like mask which is slidably mounted along one edge at right angles to the edge having the ring arrangement, said mask having a window portion in which is mounted a transparent cover or panel and an open window portion or slot arranged to expose first one information and question area through a clear covered transparent window panel and a student answering-area through an adjacent opening or slot in said window, and then when the mask is moved to the next position, to thereupon expose the previously printed correct answer and to simultaneously cover and obstruct the student answering-area with a transparent window panel so that the student may mentally check the correctness of his answer but cannot change that answer.

The remainder of the movable mask is opaque to obscure the previous and subsequent questions and answers. The mask is flexibly and pivotally mounted along one lateral edge thereof so that it may be folded or rotated transversely and at right angle to the flexible edge which carries the plurality of sheet clamping rings to permit selective turning of program sheets on the mounted clamping rings.

Important objects and accomplishments of our invention include the following:

(a) To provide a self-tutoring portable teaching device employing printed or written programs having information, questions and answers novelly positioned on the respective pages or sheets, and which includes a pair of relatively rigid backing sheets or covers flexibly connected together along adjacent edges for selective pivotal or hinged movements of said backing sheets; a releasable clamping device for punched sheets or pages including rings mounted on one of said backing sheets substantially adjacent said flexible connection; a guide track means mounted along one lateral edge on the inside face of said rigid backing sheets; a masking member having a window and a transparent panel in said window and an elongated slot or opening, said masking member having on one lateral edge thereof means for slidably mounting it relative to said backing sheets whereby a user may selectively position said masking member to successively expose spaced apart information-bearing areas on the information sheets attached to said clamping means and to selectively position said slot to permit writing therethrough on the desired areas of the information bearing sheets and to obstruct the applied writing though leaving the writing visible and expose the printed answer when said masking member is moved upwardly along said slidable mounting means to the desired position, to thereby enable a student to see whether the previously written answer is correct.

(b) To provide a portable self-tutoring device having the aforesaid features and wherein said selectively movable and pivotal window bearing masking member is normally superposed upon the information-bearing sheets and is selectively slidable upwardly or downwardly and has mounted in the window thereof a transparent plastic panel and with an open writing slot adjacent said panel, said transparent panel being adapted to overlie and obstruct the previously written answer on the underlying printed sheet.

(c) To provide a portable self-tutoring device having flexibly connected rigid binder covers and releasable clamping rings mounted adjacent the juncture of said covers for holding punched information-bearing sheets or pages, and having a masking panel having a window and an opening and adapted to be selectively superposed over sheets in said binder covers, and having a track and guiding means at one edge of said binder covers and means on one edge area of said masking panel slidably engaging said track and guiding means, whereby said masking panel may be successively moved to different positions to cause said opening successively to overlie the answering areas on the information sheets and in certain positions to cause said window to overlie previously written answers and to obstruct change of such answers.

A further accomplishment of our invention is the provision of a portable self-tutoring device having the aforedescribed features and having an opaque second mask adjustably and rotatably mounted relative to said first masking member for selectively reducing the size of the writing and answering area so that greater portions of the printed information and answering areas may be exposed to view and so that exposure of the answer-bearing area may be controlled.

The following illustration of our preferred form of this invention is described with reference to numerals borne on the accompanying drawings. As shown on the drawings:

FIG. 1 is an elevational view of our portable teaching machine.

FIG. 2 is a cross sectional view taken on a plane indicated by line 2—2 of FIG. 1.

FIG. 3 is an elevational view thereof, with upper portions broken away, and illustrating the mask and connected parts in lower position.

Figure 4:
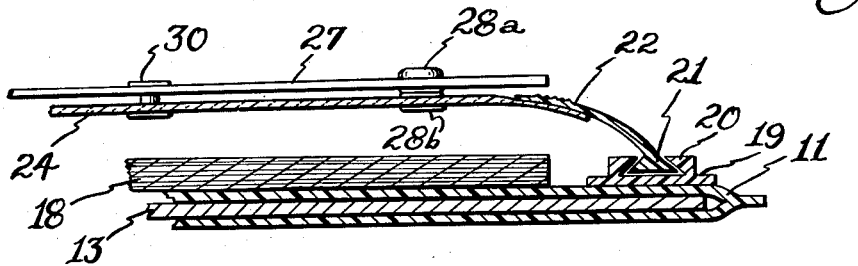
FIG. 4 is a partially cross sectional view taken on line 4—4 of FIG. 1.

Numeral 10 designates a relatively rigid substantially rectangular backing sheet and a protective supporting cover. Numeral 11 designates a second substantially rectangular rigid back or backing sheet and supporting cover. Said backing sheets may be of any suitable material and suitably reinforced. Said backing sheets or covers are connected along one edge of each thereof by an elongated flexible hinge member 12 suitably bonded or otherwise secured thereto so that said rigid sheets and covers 10 and 11 will hinge and pivot and thereby form a binder. In the form illustrated each of said backing sheets or covers are illustrated as being formed of a flat hollow envelope-like cover of plastic or equivalent material having an inner rigidifying stiff panel 13 enclosed in each thereof.

Suitably secured, for example by rivets to the edge area of binder cover 11 and adjacent the hinge member 12 are a plurality of spaced apart co-operating metal clamping rings 14 which are preferably spring mounted on a suitable elongated metal base 15 which is preferably secured by rivets 16 to said lower rigid sheet or cover 11, said sectional binding rings 14 being separable with the aid of levers 17 whose ends project as illustrated. Said rings 14 are adapted to releasably hold a plurality of punched sheets or pages 18 which normally have printed information and questions reproduced thereon.

Mounted on the back or rigid sheet 11 inward of the left lateral edge of said back or cover 11, as illustrated in FIGURES 1 and 3, is a guide track or guide member 19 which is preferably of channel-like cross section having a longitudinal groove therein partially defined by spaced integral flanges 20 as illustrated in FIGURES 2 and 4.

Numeral 21 designates an elongated flexible anchoring member or hinge element which preferably is of T-shaped cross section and preferably made of suitable plastic. The base of said anchoring member 21 is of a width to be inserted into and slide in the groove of the guide track 19.

Suitably connected to the flange of member 21, for example by adhesion or heat bonding, is one lateral edge of a substantially rectangular primary mask 22 which preferably is formed of flexible sheet material. Said mask 22 is preferably of a size to substantially cover the inner face of the lower binder cover 11 when said mask is lying flat and in lower position and said mask is selectively removable by sliding it, and its hinge member out of the upper end of track member 19.

Said mask 22 has an elongated transversely extending window 23 therein formed by a rectangular opening and by a transparent panel 24, preferably of plastic, suitably secured to the edges of the mask partially defining said window, for example by bonding or heat sealing. Said panel 24 is recessed as illustrated so as to form a rectangular elongated slot or opening 25 as illustrated, which provides a transverse student writing area of sufficient size to permit writing therethrough of normal answers upon specified defined areas of pages or sheets lying below said mask 22.

A lower portion of one of the information sheets 18 is illustrated in FIGURE 1 and the question bearing area is indicated at the upper left thereof by numeral 18a; the printed answer area or panel as 18b and the student answer area or panel as 26. Each printed or otherwise reproduced information sheet 26 bears a plurality of superposed group of said information and answering areas, each group being preferably defined by separating transverse printed lines or borders, as illustrated.

The printed question areas are positioned on the information sheets so that the printed question on each will be visible through the transparent panel 24 and the student answering area will be positioned below the open slot 25 to permit the student to write his answer thereon.

During such writing the printed answer is obstructed by the upper portion of a flap, shield or secondary mask 27 which is adjustably mounted on the lower portion of mask 22, preferably by a pivoting tubular rivet 30. Said shield 27 has mounted thereon a suitable releasable fastener portion, such as a female snap element 28a, which is mounted in said flap or shield 27. An interfitting stud or rivet 28b is mounted on the left portion of said mask 22, as shown in FIG. 4.

Thereafter, the student will slide downwardly the mask 22 to expose to view the printed answer in the area 18b which will instantly inform him whether or not his written answer was correct. In this shifted position, the right hand portion of the transparent window panel will be over and obstruct his written answer to thereby prevent any change thereof.

When the student is ready to answer the next question, the student will shift or slide the mask 22 downwardly until the upper edge defining the window will substantially register with the upper border line of the next box or border and thereby make visible the next printed question and permit him to write the answer thereto through the slot 25. These steps are successively repeated until the student has written the answer and checked same which is in the lowermost box on the information sheet.

When one information sheet has been completed, the mask is lifted and pivoted on its said hinge means and the completed information sheet will be flipped upwardly and positioned upon the upper rigid back 10.

Figure 5:
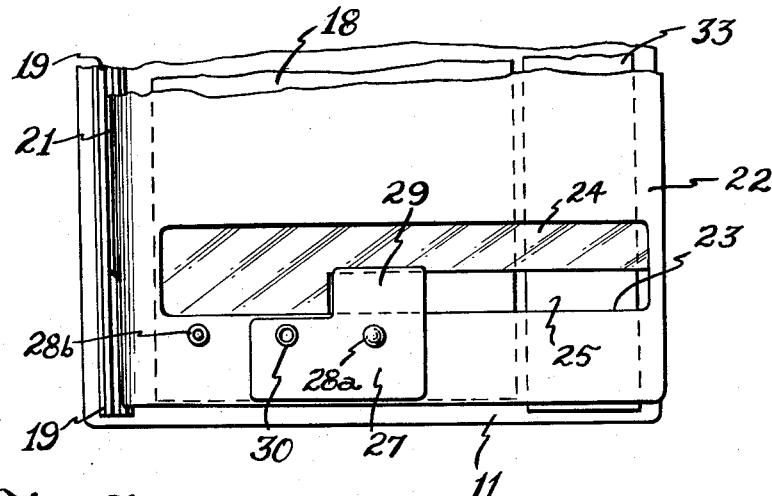
FIG. 5 is a fragmentary view, with parts broken away, of the lower portion of our device with the mask and other parts in lower position.
Figure 6:
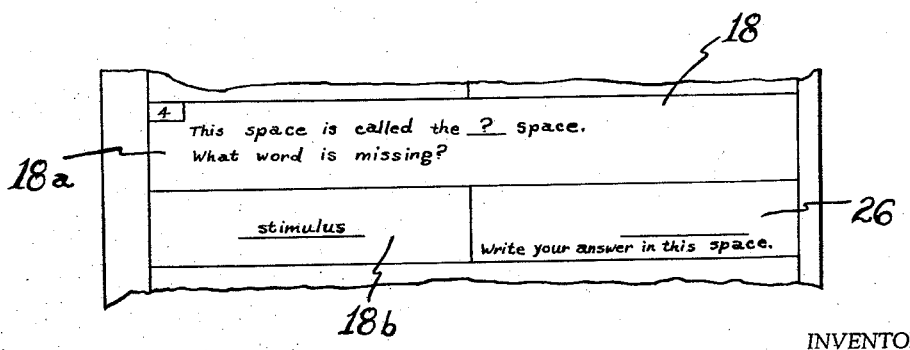
FIG. 6 is a fragmentary plan view of a portion of one of the printed sheets and showing the relative positions of the respective spaces thereon.

As illustrated in FIGS. 1, 3 and 5, the shield or secondary mask 27 is of substantially L-shape and has an integral extension 29. Said mask 22 has mounted therein a second male stud element 31 to the right of rivet 30 a distance equal to the distance between rivet 30 and stud 28b. This provides for adjustable positioning of the shield or flap 27 with its longer area extending upwardly, as illustrated in FIGS. 1 and 3, and when it is desired that the printed answer on the left portion of the box be concealed and the printed information and question area be increased at the time the student's answer is to be written, the shield or flap 27 is released by disengaging the female head 28a from stud 28b and partially rotating flap 27 and refastening head 28a upon stud 31 to releasably hold the flap in the upside down position shown in FIG. 5. The position of the shield or flap 27, as illustrated in FIG. 5, decreases the size of the student answering area and selectively increases the size of the printed information and question area, as greater area is required for some printed questions, and this provides for use of different printed pages having larger question areas of varying sizes.

Said slidable and pivotal primary mask 22 may optionally be formed of plastic sheet or equivalent flexible or rigid sheet material suitably hinged or pivotally and slidably connected to the edge portion of one of the rigid backs, as stated. The hinging and pivoting member and track means described is illustrative only and may be varied by equivalent hinging, pivoting and slidable members which slidable members may be suitably connected to the primary mask.

We also desire it to be understood that the described means represented by the clamping rings may be positioned and secured inward of the lateral edges of one of the rigid backs and at different angular positions and the guide track means and mask connecting means secured in different cooperating positions relative to the supporting back at either side thereof.

As illustrated in FIGS. 1 and 3, the lower back or cover 11 has a transverse recess or slit 32 formed therein inward of its right lateral edge which provides means for holding a pad or plurality of relatively narrower sheets 33 upon the right hand portion of the back 11 and in position so the student may optionally write his answers on the uppermost sheet thereof through a portion of the writing slot 25. In this way the resulting written answers will be upon such narrower sheets, which may be optionally removed and checked by a teacher or the same may be moved to upper position along with the respective printed program and information-bearing pages.

Our teaching or self-tutoring device, such as exemplified in the aforesaid description, provides great advantages in the saving of time by instructors and teachers, and has the advantage of permitting students to write various information, tests and answers, without assistance or instruction from others, and also provides a novel device for building up of self-reliance and confidence.

A further advantage is in providing a self-tutoring means which enables teachers to relatively quickly check and grade the written pages and answers thereon.

While the foregoing specification sets forth the invention in specific terms, it is to be understood that numerous changes may be resorted to without departing from the spirit and scope of the invention, as claimed hereinafter, and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:

1. A portable teaching device comprising rigid rectangular connected supporting sheets; flexible means connecting one edge of each thereof; means for rotatably and releasably holding a collection of information and question program pages on the first of said supporting sheets; a movable mask; means on one of said supporting sheets for slidably mounting said mask relative to said supporting sheets; said mask having a window, a portion of said window being open and the remaining portion thereof having a transparent panel therein; said mask, when slidably moved, being adapted to alternately reveal one information and question area on information pages positioned and held on said supporting sheets and to simultaneously expose one answering area through said open window portion, and on further movement of said mask, to expose to view the correct answer and to position said transparent panel over the answering area of said pages to thereby bar access to the latter, and an adjustable shield adjustably mounted on said mask adjacent said window and adapted to be releasably secured to reduce the window opening and the size of the exposed area visible through said window.

2. A portable teaching device comprising rigid rectangular connected supporting sheets; flexible means connecting one edge of each thereof; means for rotatably and releasably holding a collection of information and question program pages on the first of said supporting sheets; a movable mask; means on one of said supporting sheets for slidably mounting said mask relative to said supporting sheets; said mask having a window, a portion of said window being open and the remaining portion thereof having a transparent panel therein; said mask, when slidably moved, being adapted to alternately reveal one information and question area on information pages positioned and held on said supporting sheets and to simultaneously expose one answering area through said open window portion, and on further movement of said mask, to expose to view the correct answer and to position said transparent panel over the answering area of said pages to thereby bar access to the latter; an angular shield mounted on the lower portion of said mask, and means for adjustably fastening said shield on said mask to cause varying portions thereof to project over said window to thereby selectively expose greater areas of printed pages through said window.

References Cited in the file of this patent

UNITED STATES PATENTS

| | | |
|---|---|---|
| 2,169,266 | Matter | Aug. 15, 1939 |
| 2,234,075 | Carolin | Mar. 4, 1941 |
| 2,542,165 | Taylor | Feb. 20, 1951 |
| 2,836,433 | Dolan | May 27, 1958 |
| 2,864,337 | Reuter | Dec. 16, 1958 |
| 3,106,026 | Jackson et al. | Oct. 8, 1963 |

OTHER REFERENCES

Viorst, "Machines For Teaching," pages 378–379, Science News Letter, June 17, 1961.